OSCILLATION CIRCUIT WITH SUPERCONDUCTOR

Original Filed Dec. 2, 1948 2 Sheets-Sheet 1

Inventors
ERIC ARVID ERICSSON
ANDERS OSSIAN JORGENSEN
SUNE LAMBERT OVERBY
By Leech & Radue Attorneys

OSCILLATION CIRCUIT WITH SUPERCONDUCTOR

Original Filed Dec. 2, 1948 2 Sheets-Sheet 2

Inventors
ERIC ARVID ERICSSON
ANDERS OSSIAN JORGENSEN
SUNE LAMBERT OVERBY

By Leech & Radue Attorneys

United States Patent Office 2,725,474

Patented Nov. 29, 1955

2,725,474

OSCILLATION CIRCUIT WITH SUPERCONDUCTOR

Eric Arvid Ericsson, Stockholm, Anders Ossian Jorgensen, Traneberg, and Sune Lambert Overby, Stockholm, Sweden, assignors to Telefonaktiebolaget L. M. Ericsson, Stockholm, Sweden, a Swedish company

Original application December 2, 1948, Serial No. 63,052. Divided and this application August 4, 1950, Serial No. 177,715

5 Claims. (Cl. 250—36)

This invention relates to the use of an electric conductor or semi-conductor of a certain character as a controlling element in a generator or oscillator.

It is known that the resistance of a conductor (or semi-conductor) within a certain range of temperature can be varied within large limits. At low temperatures the resistance of e. g. pure bismuth or pure wolfram can be varied in the relation 1:100,000 by means of changes in a magnetic field surrounding the conductor.

It is also known that the electrical resistance of all conductors at a certain temperature, usually in the neighborhood of the absolute zero, will decrease to zero (super conductivity. By using a certain material in the conductor, e. g. niobiumnitrite, this effect is established at a somewhat higher temperature. The resistance of a so-called super conductor decreases at decreasing temperature along a curve, the jump curve, which can be situated at different temperatures in dependence of a surrounding magnetic field.

The invention will be described more closely with reference to the accompanying drawings, in which.

Figure 2:
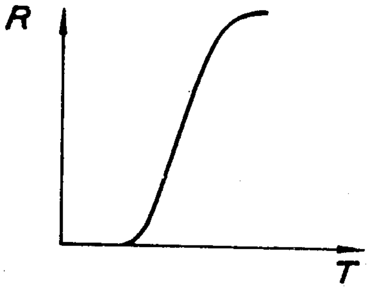
Fig. 2 shows graphically a jump curve that is the dependence of the resistance on the temperature at constant magnetic field and within a temperature range where the conductor is super conducting.
Figure 3:
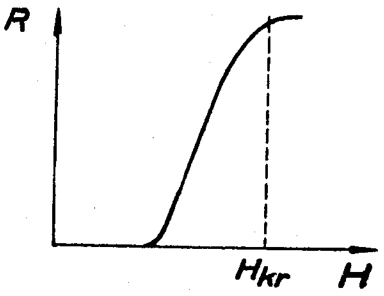
Fig. 3 is another jump curve showing the dependence of the resistance on the magnetic field at constant, low temperature within the same range.

As already mentioned, the resistance R of a super conductor can be influenced as well by changing the temperature T as by changing the magnetic field H, as is shown by means of the jump curves in Figs. 2 and 3, respectively. It is thereby of no importance whether the magnetic field originates from an outer magnetic field or is generated by the current in the super conductor. In a general way, the change of resistance in a super conductor is dependent on a change of the magnetic field and the temperature according to the following expression:

$$dR=\left(\frac{\partial R}{\partial H}\right)_T+\left(\frac{\partial R}{\partial T}\right)_H dt$$

which shows the dependence of the resistance R on: in the first term, changes of the field strength H at constant temperature, and in the second term changes in the temperature at constant field strength H.

Figure 1:
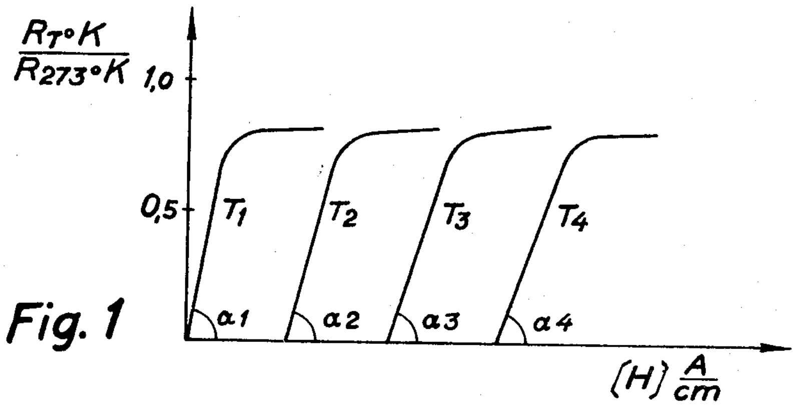
Fig. 1 shows graphically the relation between the resistance $R_{T°K.}$ at a certain absolute temperature and the resistance $R_{273°K.}$ at 273° K. in dependence of the absolute value of the field strength H in a magnetic field.

In Fig. 1 the relation between the resistances $R_{T°K.}$ and $R_{273°K.}$ is drawn in dependence on the magnetic field H for different absolute temperatures $T_1$, $T_2$, $T_3$, and $T_4$, where $T_1>T_2>T_3>T_4$ and the steepness of the curve is greatest at $T_1$ and the smallest at $T_4$, that is $\alpha_1>\alpha_2>\alpha_3>\alpha_4$. It is thus possible to choose a convenient steepness by choosing a suitable temperature when using a super-conductor as controlling element.

Figure 5:
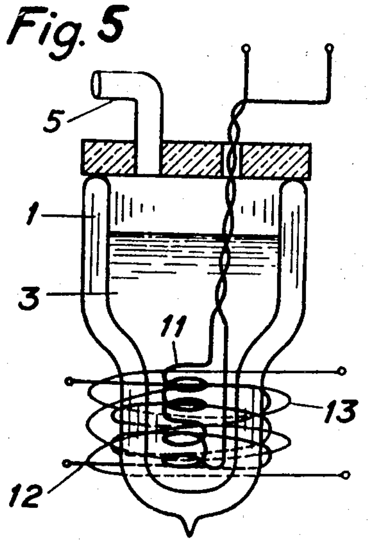
Fig. 5 shows in cross-section a typical arrangement for obtaining controlled superconduction.
Figure 4:
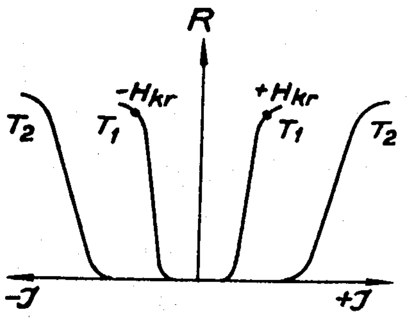
Fig. 4 shows curves of the dependence of the resistance on the magnetic field (the current) at different absolute temperatures.

Fig. 5 shows schematically a suitable manner for obtaining and using a super-conductor. In a double-walled vessel 1 withan evacuated interspace there is a super-conductor 11 immersed in a cooling liquid 3. The vessel is provided with a heat-insulated cover and an evacuating tube 5 as well as with an opening for a double conductor. The lower part of the vessel 1 where the super-conductor lies, is narrower than the rest of the vessel in order that magnetizing coils 12 and 13, wound round said part, be as small as possible. The coils are provided with terminals and the super conductor 11, which is preferably bifilarly wound, is connected to the double conductor. The coils 12 and 13 may be used to carry magnetizing currents whereby variations of the field strength of the magnetic field actuate the super-conductor 2. Variations thus arise in the resistance of the super-conductor between a minimum value zero at the lower part of the jump curve and a maximum value R at the upper part of said curve.

It appears from the preceding, that it is advantageous that the ohmic resistance at the upper part of the jump curve is as great as possible, since thereby great variations of the resistance are possible. It is therefore advantageous to use as a super-conductor niobiumnitride, the resistance of which at the upper bend of the jump curve is 75% of the ohmic resistance at room temperature, whilst the resistance of a pure metal above the jump curve decreases with the fourth power of the absolute temperature and at the upper bend of the jump curve mostly amounts only to a few tenths percent of the resistance at room temperature. By using not pure metallic super-conductors, the use of extreme cooling, for example by means of cooling with flowing helium, is avoided. When using niobiumnitride, it is sufficient to use flowing oxygen as cooling liquid, which can be produced much cheaper than flowing helium. It has even been proved, that at least partial super-conductivity exists at even so relatively high temperatures as above the boiling point of liquid air. It is even possible, by suitable thermic and chemical treatment of a super-conductor, to obtain super-conductivity at room temperature.

To be suitable for the purpose of the invention, the substance need not necessarily be such that the resistance at the lower part of the used working curve is zero (super-conduction). It is possible to use certain natrium solutions, which at about −180° have a resistance characteristic, which is similar to a normal jump curve, but does not descend to zero.

For the above-described purpose the following conductors are suitable: (*a*) super-conductors, which are not chemical elements, (*b*) semi-conductors, (*c*) non-stoichiometric connections and (*d*) metallic solutions, in which the super properties appear at temperatures, which are not too low, and their resistance at the upper bend of the jump curve is a rather great part of the resistance at room temperature.

A controlling element of said type can also be used for generating continuous oscillations. The conductor or semi-conductor is in this case surrounded by a variable magnetic field generated by means of charging and/or discharging of an energy-accumulating element.

If the temperature is constant, the second term in the equation above disappears as already mentioned, whereby the first term indicates the change in the resistance at a certain change of the field-strength at constant temperature. As appears in Fig. 6, this change in the resistance is very great within a certain area. Below, a certain field-strength $H_1$ the material is super-conducting, i. e. the resistance is very small (zero). Above the field-strength $H_1$ the resistance increases quickly and at the field-strength $H_2$ the resistance has increased to ohmic resistance.

For a practical use of the idea of the invention, most of the known connections can be used, in which self-oscillations are generated, e. g. by using a negative resistance or a feed-back.

Figure 6:
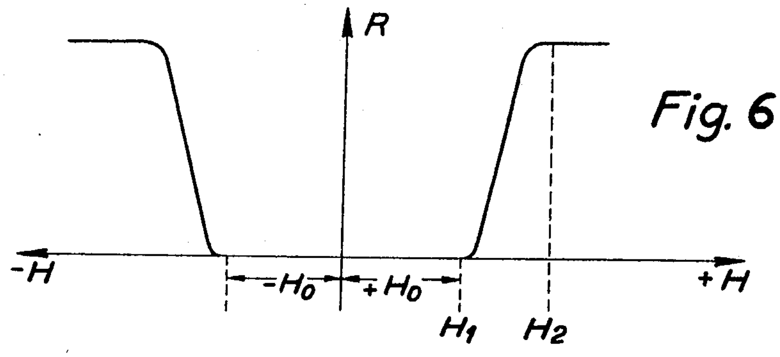
Fig. 6 illustrates the dependence of the resistance on the magnetic field strength at a certain temperature.
Figure 7:
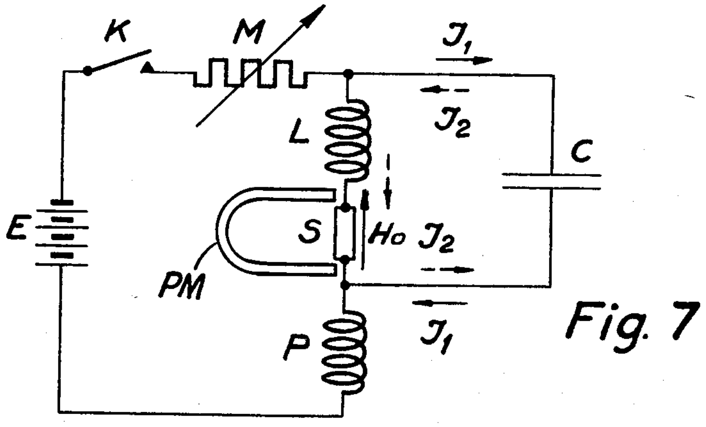
Fig. 7 shows an example of an oscillator connection according to the invention.

In Fig. 7, an embodiment of such a connection is shown. A source E of direct current can be connected by means of a contact K over a suitably adjustable resistance M to an oscillating circuit consisting of a condenser C and an induction coil L connected in parallel. A conductor S, e. g. a super-conductor such as shown in Fig. 5, the resistance of which can be changed by means of a magnetic field, is connected in series with said coil. An auxiliary coil P is furthermore connected in the feeding circuit in series with the source E of potential. The conductor S is surrounded by a constant magnetic field $H_0$, generated by a permanent magnet P—M as shown or an electromagnet. The magnetic field is further actuated by the auxiliary coil P and the field from the coil L, whereby P works together with and L against the field $H_0$, and the effect of the coil P is stronger than the effect of the coil L. The constant magnetic field $H_0$ is set in such a way, that the working point at open contact K lies at $H_1$ in Fig. 6, which means that the resistance of the conductor S is about zero (super-conduction).

Figure 8:
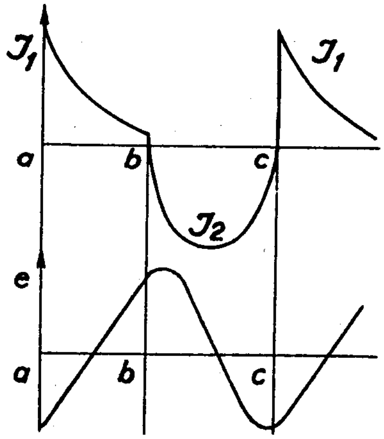
Fig. 8 illustrates how an oscillation arises.

If the feeding circuit is closed at moment *a* in Fig. 8 by means of contact K, a current flows through L, S and P, and a charging current $I_1$ flows through the condenser C. Since the coil P has a greater effect on the field than the coil L, said field is amplified and the working point moves to $H_2$ in Fig. 6, so that the super-conducting qualities of the conductor S disappears, and the resistance becomes ohmic. The charging of condenser C continues, whereby the charging current $I_1$ decreases as shown in the upper curve in Fig. 8, which shows the progress of the charging current during three time-periods *a—b*, *b—c*, and *c*. At a certain moment *b*, the current $I_1$ has fallen to such a low value, that the additional field of the coil P does not suffice any longer to keep the working point at or about $H_2$, but it is removed to $H_1$, whereby the resistance in the conductor S falls anew to super-conduction. The condenser C is thereby discharged with a current $I_2$ over S and the coil L during the time-period *b—c* (Fig. 8). The discharge oscillation would continue as a damped oscillation after the moment *c*, if at said moment *c* the additional field from the coil P had not become so strong, that the working point is again moved to $H_2$, and S becomes an ohmic resistance. A new charging of the condenser now begins, whereafter the whole process is repeated. The lower curve in Fig. 8 shows the progress of the voltage over the condenser C.

The generated oscillations are not sine-waves. If sinusoidal oscillations are desired, it is only necessary to separate the fundamental oscillation or a harmonic by means of a filter in a way known per se, e. g. by means of a circuit tuned at the desired frequency.

It can also in certain cases be desirable to use, instead of a single oscillating circuit as shown in Fig. 7, a complicated device with several resonance frequencies, and to dimension the elements so that the generated oscillation lies near a resonance frequency.

According to the invention, it is also possible to generate terminating oscillations, which have no natural oscillation at all. A device of that kind is obtained, if in the device according to Fig. 7 the induction coil L is exchanged against a suitably dimensioned ohmic resistance, over which the condenser C is discharged after the conductor S has become super conducting. For generating of the magnetic contrary field during the discharging, a second auxiliary coil can be connected in series with the discharging resistance the field of which actuates the conductor with a desired direction and strength.

It is also possible to use a wave-guide as an oscillating system. An experimental examination of the super-conducting qualities at very high frequencies has shown, that the same acceleration equation as for high vacuum is true for the electrons in a super-conductor. Thus $$E=\frac{m}{e^2n}\cdot\frac{dI}{dt}$$

where $E$=the electrical field strength,
$m$=the mass of the electron,
$e$=the charge of the electron,
$n$=the number of electrons per unity of volume,
$I$=the current intensity, and
$t$=the time.

Due to said relation, the running time for the electrons in the super-conductor can also be used to generate oscillations of the highest frequency.

As appears from Fig. 6, the curve of the resistance for the positive values in the magnetic field has a correspondence on the negative side. The two curves lie symmetrically in relation to $H=0$. The curves can be used in combinations, e. g. so that each of them controls cooperating oscillating processes or so that they limit the amplitudes.

This application is a division of our copending application Serial No. 63,052, filed December 2, 1948, now abandoned.

We claim:

1. Apparatus for producing continuous oscillations comprising in combination, a conductor the resistance of which falls suddenly along a steeply sloping curve to the superconductivity range within a critical temperature range, means surrounding said conductor with a constant magnetic field, means maintaining the temperature of said conductor in the superconductivity range under said field conditions, an oscillating circuit including a condenser and said conductor connected in parallel, means for energizing said circuit including a coil connected to produce a field sufficiently augmenting the first field to eliminate the condition of superconductivity during charging of the condenser, said coil being so connected as to be independent of the discharge circuit of the condenser.

2. Apparatus in accordance with claim 1 wherein a second coil is provided whose field opposes that of said first coil, said second coil being arranged in the said oscillating circuit to be energized by the condenser discharge through the said conductor.

3. Apparatus in accordance with claim 2 in which the field of the second coil is of less strength than that of the first coil.

4. Apparatus for producing continuous oscillations comprising in combination, a conductor the resistance of which falls suddenly along a steeply sloping curve to the superconductivity range within a critical temperature range, means surrounding said conductor with a constant magnetic field, means maintaining the temperature of said conductor in the superconductivity range under said field conditions, a resonant circuit including an energy-accumulating element and said conductor connected in parallel, means for charging said element, means energized by the charging current for producing a changing magnetic field superimposed on said constant field, the augmentation of the constant field by the aiding component of said changing field being sufficient to eliminate the super-conductivity characteristic of said conductor.

5. Apparatus for producing continuous oscillations including in combination, a conductor the resistance of which falls suddenly along a steeply sloping curve from ohmic to the superconductivity range within a critical temperature range, means subjecting said conductor to a constant magnetic field, means maintaining the temperature of said conductor in the superconductivity range under said field conditions, a resonant circuit including a capacitance shunting said conductor and a series inductor whose field opposes the constant field, a second inductor whose field augments the constant field, a source of direct current connected through said second inductor to said capacitance, the augmenting of the field during capacitance charging serving to eliminate the condition of superconductivity of the conductor.

References Cited in the file of this patent

UNITED STATES PATENTS

| | | |
|---|---|---|
| 685,012 | Tesla | Oct. 22, 1901 |
| 1,948,209 | Fichandler | Feb. 20, 1934 |
| 2,189,122 | Andrews | Feb. 6, 1946 |
| 2,533,908 | Andrews | Dec. 12, 1950 |

OTHER REFERENCES

Journal of Research of the National Bureau of Standards, vol. 20, February 1938, Research paper RP 1070 by Silsbee.